US008447690B2

(12) United States Patent  (10) Patent No.: US 8,447,690 B2
Salmon Rock et al.  (45) Date of Patent: May 21, 2013

(54) BUSINESS AND SOCIAL MEDIA SYSTEM

(75) Inventors: Alejandro Salmon Rock, Mexico City (MX); Manuel de Jesus Salmon Rock, Mexico City (MX); Manuel de Jesus Salmon Salazar, Mexico City (MX)

(73) Assignee: Triceratops Corp., Phoenix, AZ (US)

( * ) Notice: Subject to any disclaimer, the term of this patent is extended or adjusted under 35 U.S.C. 154(b) by 229 days.

(21) Appl. No.: 12/878,177

(22) Filed: Sep. 9, 2010

(65) Prior Publication Data

US 2011/0060683 A1    Mar. 10, 2011

Related U.S. Application Data

(60) Provisional application No. 61/240,781, filed on Sep. 9, 2009.

(51) Int. Cl.
*G06Q 40/00*    (2012.01)

(52) U.S. Cl.
USPC ................................ 705/41; 705/35; 705/38

(58) Field of Classification Search
USPC .......................................................... 705/35
See application file for complete search history.

(56) References Cited

U.S. PATENT DOCUMENTS

| | | | |
|---|---|---|---|
| 6,072,862 A * | 6/2000 | Srinivasan | 379/100.08 |
| 6,222,909 B1 * | 4/2001 | Qua et al. | 379/88.22 |
| 2003/0187930 A1 * | 10/2003 | Ghaffar et al. | 709/205 |
| 2004/0077334 A1 * | 4/2004 | Joyce et al. | 455/406 |
| 2004/0210439 A1 * | 10/2004 | Schrocter | 704/260 |
| 2004/0260792 A1 * | 12/2004 | Speicher | 709/219 |
| 2005/0059426 A1 * | 3/2005 | Aarnio et al. | 455/550.1 |
| 2005/0094777 A1 * | 5/2005 | McClelland | 379/52 |
| 2006/0239424 A1 * | 10/2006 | Walter | 379/88.22 |
| 2007/0039036 A1 * | 2/2007 | Sullivan et al. | 725/133 |
| 2007/0219799 A1 * | 9/2007 | Ozkaragoz et al. | 704/260 |
| 2009/0304170 A1 * | 12/2009 | Bettis | 379/207.11 |
| 2011/0106894 A1 * | 5/2011 | Hodge et al. | 709/206 |

FOREIGN PATENT DOCUMENTS

GB           2403373 A    * 12/2004

* cited by examiner

*Primary Examiner* — William Rankins
(74) *Attorney, Agent, or Firm* — Schmeiser, Olsen & Watts LLP

(57) ABSTRACT

A business and social media system is provided for establishing communication services between people in different countries. The system includes a core system module, the core system module including a server for maintaining information regarding a client and a means for establishing communications services between a client and another person. The system further includes external modules in communication with the core system module, the modules including a telephony termination module, a telephone module service module, an SMS module, a contact center module, a mobile application module, a web application module, a retail module, a bank module, and the like.

13 Claims, 5 Drawing Sheets

Card 80

BUSINESS AND SOCIAL MEDIA SYSTEM

CROSS-REFERENCE TO RELATED APPLICATIONS

This application claims priority to U.S. Provisional Patent Application to Manuel Salmon Rock entitled "BUSINESS AND SOCIAL MEDIA SYSTEM," application No. 61/240,781, filed Sep. 9, 2009, the disclosure of which is hereby incorporated entirely herein by reference.

BACKGROUND OF THE INVENTION

1. Technical Field

This invention relates generally to communication services and more particularly to a communication convergence service or platform through means such as but not limited to calls, SMS, as well as money transfers, internet video, SMS Chat, web chat, wikis and the like.

2. State of the Art

The ability to connect people for the purpose of communication is a constant desire and in many circumstances a constant need. This need becomes increasingly difficult as a person moves from one country to another. The cost to communicate increases, ability is diminished and opportunity is lessened.

Conventional methods of communication include prepaid calling cards, mobile phones, computer communications, and money transfers through wire transfer and similar systems. These means are not convenient and use of such means is typically accompanied by a premium that is paid in various ways.

Human interface, particularly with friends, family and the like is important and desired by most every person in the world. Accordingly, there is a need in the field of human communication for an improved and innovative communication system.

DISCLOSURE OF THE INVENTION

The present invention relates to a business and social media system allowing people to establish communication services through calls, SMS, MMS, money transfers and the like. The system utilizes a card to provide access to the system and allows initiation of a communication, wherein the system integrates several communication aspects within a single system and controlled by a core system module.

An aspect of the present invention includes a business and social media system, the system comprising a core system module, the core system module including a server for maintaining information regarding a client and a means for establishing communications services between a client and another person. The system further comprises external modules in communication with the core system module, the modules including a telephony termination module, a telephone module, a service module, an SMS module, a contact center module, a mobile application module, a web application module, a retail module, a bank module, and the like.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a business and social media system allowing people to establish communication services through calls, SMS, money transfers and the like. The system allows initiation of a communication between a client 2 and another person, or common person 4, wherein the system integrates several communication aspects within a single system and controlled by a core system module. The system may be used for establishing calls, SMS, MMS, as well as money transfers, internet video, SMS Chat, web chat, wikis and the like. These services may be pay-per-use, prepaid, accounts of usage, and the like.

Figure 1:
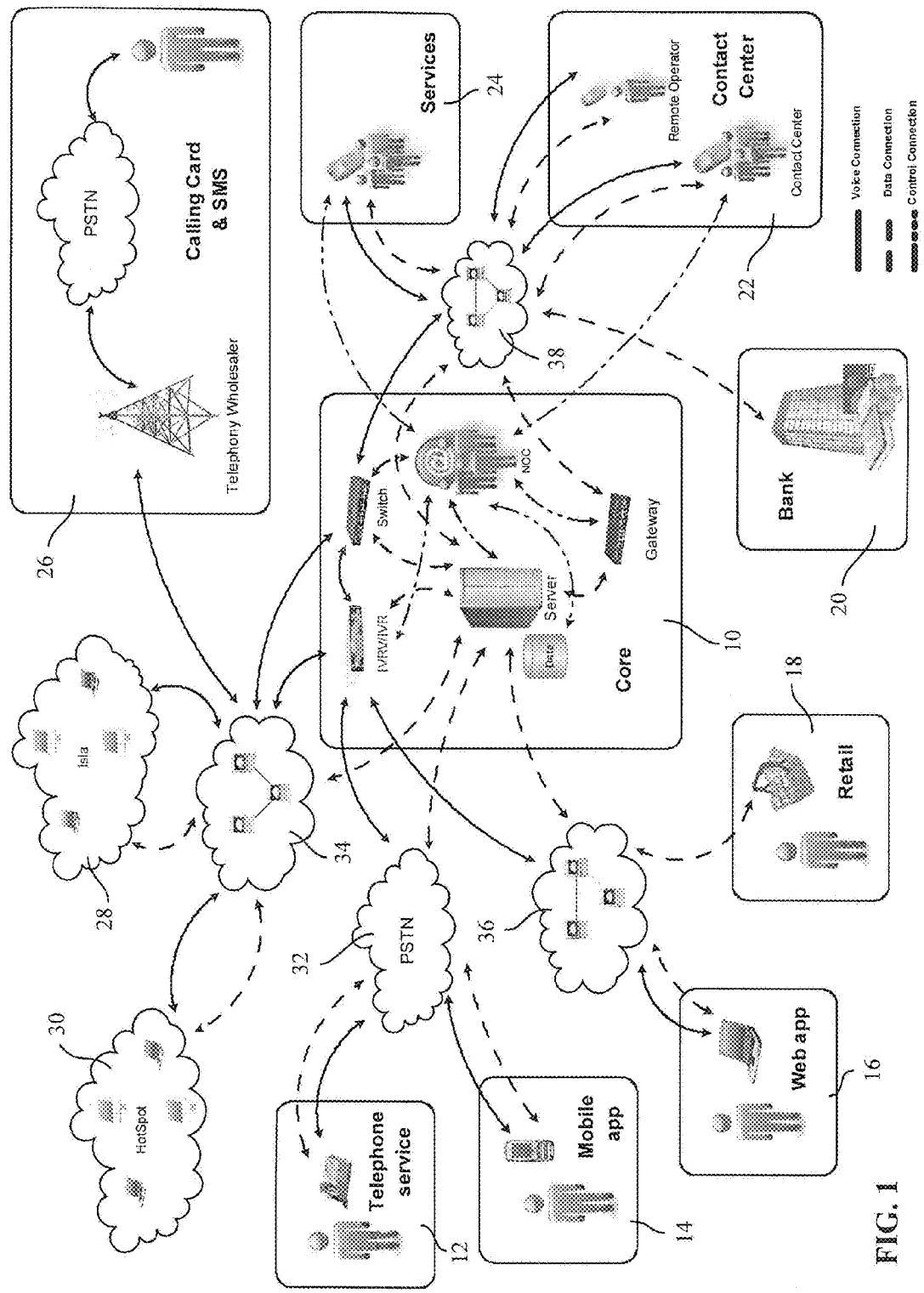
FIG. 1 is a diagrammatic view of a business and social media system in accordance with aspects of the present invention.

Referring to the drawings, FIG. 1 depicts a business and social media system 10 in accordance with particular embodiments of the present invention. The system 100 includes a core system module 10 and external modules, including, but not limited to, a telephone service module 12, a mobile application module 14, a web application module 16, a retail module 18, a bank module 20, a contact center module 22, a services module 24, a telephony services module 24, an SMS module 26, an Isla module 28 and a hotspot module 30. Each external module is connected to the core system module 10 by various network connections, such as, but not limited to network connections 34, 36 and 38, as well as a public switch telephone network ("PSTN") connection 32. These network connections provide the ability for users/clients of the system 100 to connect to the core system module 10 and then to be routed through other network connections by the system 100 to another user of the system 100 or to a communication device associated with another person 4 with whom the client 2 desires to communicate.

Figure 2:
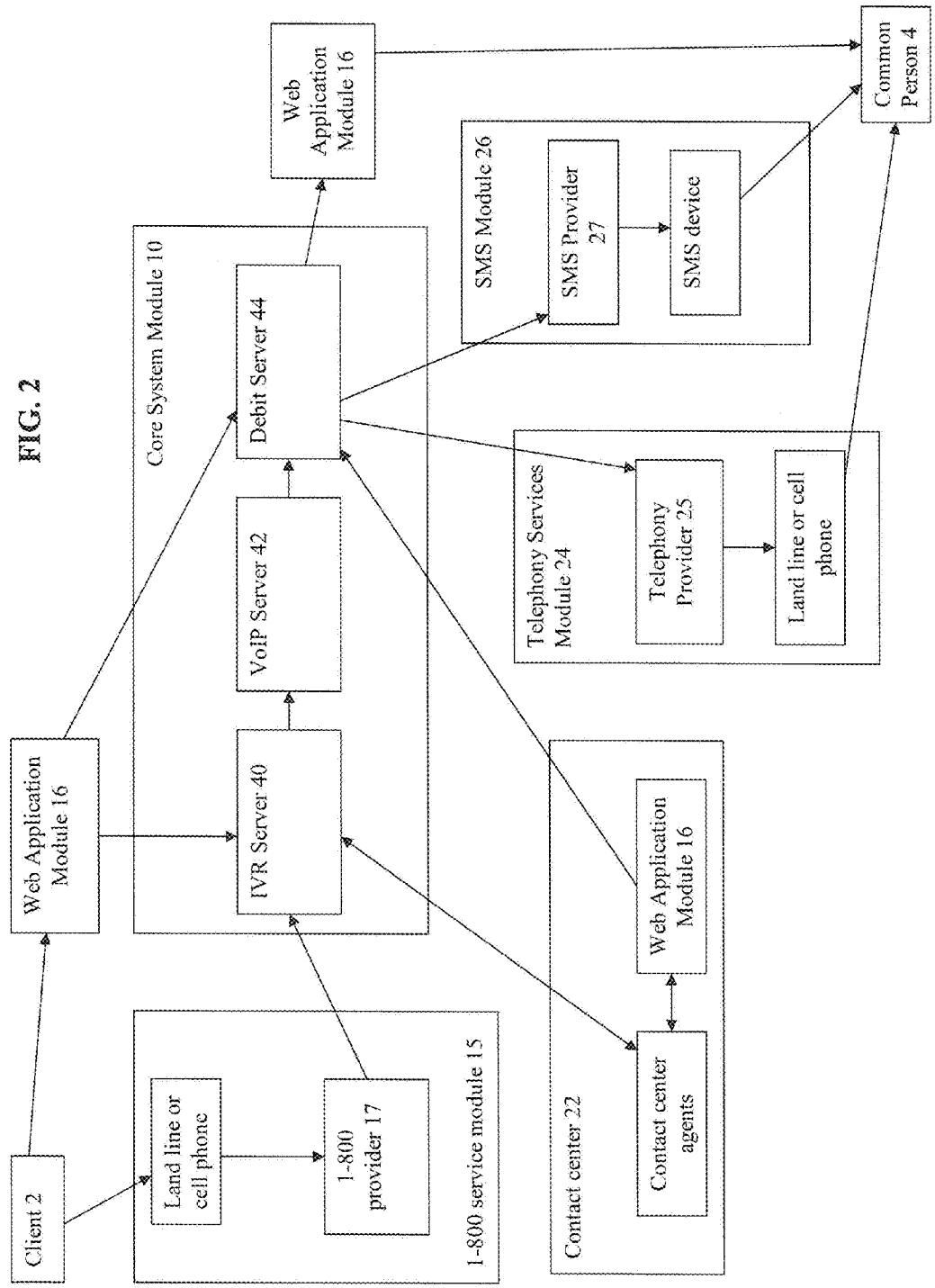
FIG. 2 is a diagrammatic view of a component of a business and social media system in accordance with aspects of the present invention.

The system 100 operates to connect clients of the system 100 with other people and other clients. For example, a client 2 may utilize the telephone service module 12 or mobile application module 14 by dialing a predetermined number, including, but not limited to, a free call number, referred to in this application as a 1-800 number, associated with the system 100, as shown in FIG. 2, to access the system 100, wherein the call is directed to the core system module 10 through a PSTN 32. Once the client 2 has been verified, the client 2 may then designate the number with which the client 2 wishes to communicate and the core system module 10 may then route the communication to the proper line based on the number provided by the client 2. The system module 10 may also evaluate the capabilities of the communication device associated with the number provided by the client 2 and prepare and transmit the communication in the form suitable to the device.

Other embodiments include the client 2 accessing the system 100 through a web application module 16, a hotspot module 30 and an Isla module 28. These modules also provide connection of a user or client 2 with the core system module 10 in order to access the services provided by the system 100, including routing the communication to the proper line based on the number provided by the client 2. The system module 10 may also evaluate the capabilities of the communication device associated with the number provided by the client 2 and prepare and transmit the communication in the form suitable to the device.

Retail module 18 and bank module 20 may be utilized to transfer data to and from the core system module 10. For example, a client 2 may use the retail module 18 in order to access the system 100 to book travel plans or to purchase goods or services. The bank module 20 may be utilized by the system 100 to transfer money received to designated accounts, or by a user to transfer money to a prepaid, reloadable access card, wherein the user's bank account is tied into the prepaid card, and as money preloaded on the card is used the bank replenishes the card automatically through use of the bank module 20. Other embodiments of the present invention allow for a user to earn cash back. For instance, as the user continually uses the system 100 by prepaid card, credit card or other method of payment, the user may establish points or some other indication as to an amount of cash back that corresponds to the amount of time the user utilizes the system 100.

The contact center module 22 operates to provide assistance to users and providers associated with the system 100. The contact center module 22 is utilized to resolve concerns and to ensure proper operation of the system 100. The contact center may also be used by remote users who cannot access the system 100 via web interface. The contact center then acts as the "hands" for these clients in these situations, essentially performing actions via the web interface within the system 100 on the client's behalf as instructed by the client.

When a client/user accesses the system 100, such as by the telephone application 12 or the mobile application 14, the client 2 is routed through an interactive voice response system ("IVR") 40. The IVR system 40 is an automated system that can properly and accurately route clients to the communication device associated with the number the client 2 has designated. The IVR system 40 may utilize a series of audible questions or commands that help the system 100 locate and communicate with the communication device designated by the client 2 and associated with the person 4 with which the client 2 wishes to communicate. The IVR system 40 may also utilize the series of questions to search for, find, and provide the needs of the client 2 to the client 2 or to determine the need for additional resources to answer the questions and needs of the client 2. For example, the IVR system 40 may evaluate the needs of the client 2 and provide the necessary services or access to and information regarding the necessary services, such as, but not limited to, legal assistance, financial services, psychological assistance, or medical help. The IVR system 40 is structured to allow the client 2 to access and utilize the system 100 anonymously and without undesired interaction with support personnel.

However, on the other hand, support personnel can assist the client 2, when needed or desired. For example, when the client 2 desires or needs human operator assistance, has an unresolved concern, has questions regarding the system 100, or has any other issue with the system 100, the system 100 may route the client 2 to the contact center module 22 at the request of the client 2 or by an automated determination, made by the system 100, that the client 2 is having difficulty operating or interacting with the system 100.

The SMS module 26 can be utilized to send an SMS to the core system module 10, and then the core system module 10 transfers the SMS to the proper destination. In some embodiments, the SMS module 26 can be utilized to convert speech to text and send as an SMS or, alternatively, convert text to speech and send the SMS as a voice message. Additionally, VoIP modules 42 may be used to contact and call other people utilizing the system 100.

Figure 5:
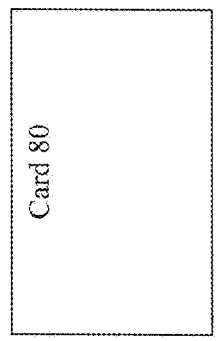
FIG. 5 is a planar view of a component of a business and social media system in accordance with aspects of the present invention.

It will be understood that embodiments of the present invention are of particular usefulness for customers based in two different countries. The system contemplates the use of a card 80, as shown in FIG. 5, similar to a calling card, wherein users can purchase the card 80 having a prepaid amount of money or usage associated with the card 80; the card 80 may be loaded with additional money or may even be linked to a bank account of the user/client in order to automatically replenish any used amount of the card 80. The card 80 may include a predetermined or user-designated personal identification number ("PIN") in order for the user to access the system 100. This card 80 may be utilized in all means of accessing the system 100, including access via telephone, telephony, cell phone, VoIP, Web applications, SMS, MMS, and the like. Other options include mobile devices, such as cell phones, or other types of web-enabled phones or devices. Other embodiments utilize kiosks to access the system 100. Each of these types of devices promotes a type of remote access to the system 100, wherein a user has additional options for accessing the system.

In particular embodiments, in the service provided by the system 100 a client 2 accesses the system 100 by use of a card with a PIN, wherein the client 2 utilizes a phone to access the system, enters the PIN to verify the client's ID and then activates the system by use of the IVR server 40 of the core system module 10. The core system module 10 integrates all of the services provided by the system 100, which includes, but is not limited to, phone services, VoIP, telephony services, SMS services, and/or money transfers. The services provided by the system 100 also include providing professional assistance for traveling, legal matters and psychological and medical help. The system 100 also provides services relating to the transfer of money from the client's account to an account associated with the number designated by the client 2. The system 100 is established to allow users of all ages and abilities to use the system. Additionally, the system 100 is not based on social status and allows all users to utilize the system to communicate with other communication devices and another person 4 from a different country.

The system 100 establishes the ability to connect a plurality of users in various modes of communication. These various modes of communication may be voice, VoIP, SMS, MMS, audio visual, video conference, and the like. The convergence system 100 is formed and established to handle these various types of communication with a single system and flexible payment methods to satisfy the needs of the various users of the system 100.

The system 100 requires a predetermined type of personnel required to ensure the proper operation and function of the system. Each element of the system is an important aspect in order to provide all the modes of communication to all users. While particular embodiments of the present invention depict all of the components of the system as indicated above, other embodiments may only have selected components.

It will be understood that this particular system 100 is useful for international communications. It allows a user in one country to communicate with a user in another country without concern of having the proper equipment and the like. Particularly, the system 100 resolves the different system requirements of one country and another country with one another, resolves the different methods of communication and communication protocols of one country and another country with one another, and resolves the varying communicative capabilities of the various types of communication devices within each country to facilitate the communication of the client/user with another person 4 using a single system and with a simple method of payment.

Figure 3:
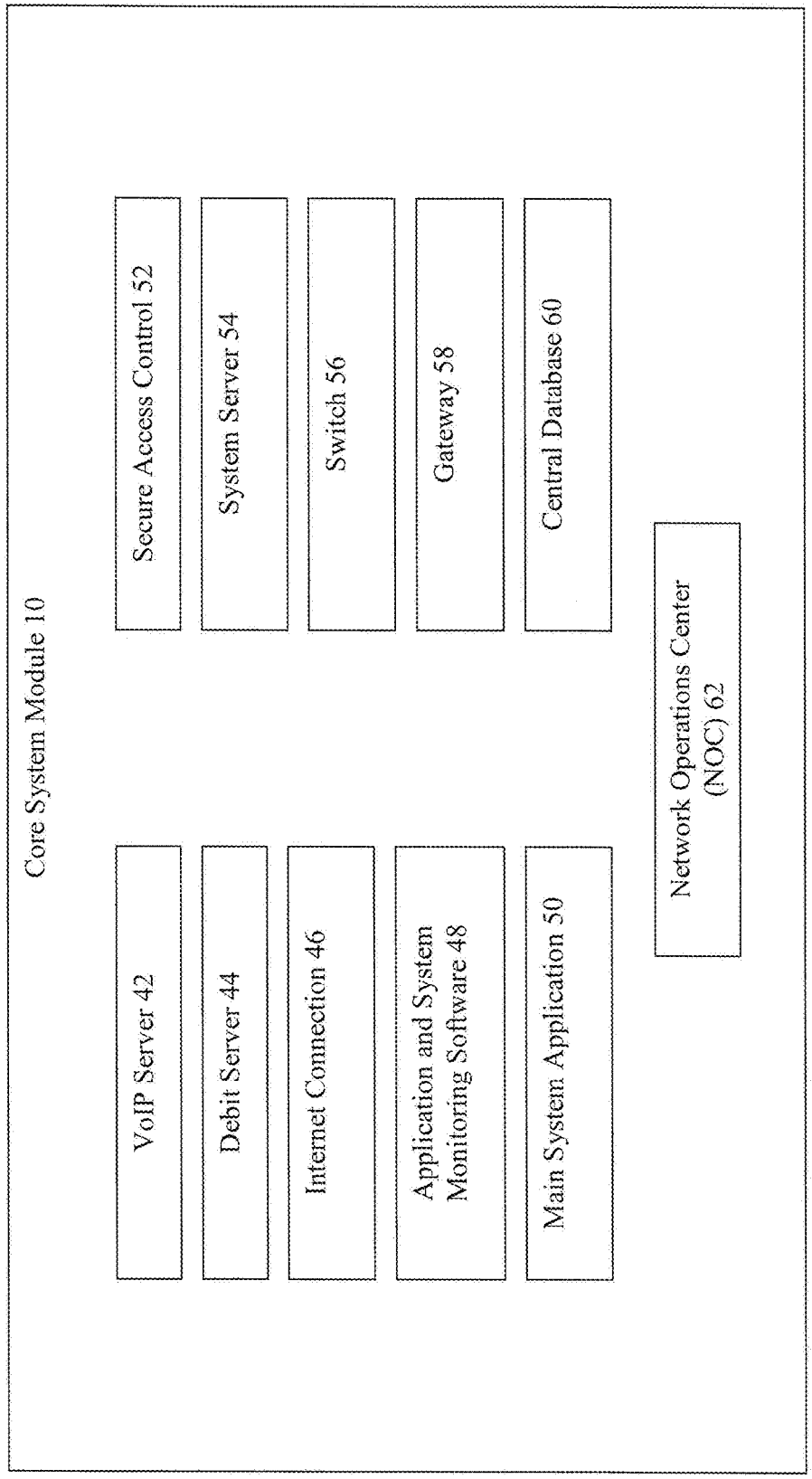
FIG. 3 is a diagrammatic view of a component of a business and social media system in accordance with aspects of the present invention.

According to particular embodiments, the core system module 10 comprises, as shown in FIG. 3, at least an Interactive Voice Recognition ("IVR") Server 40, a Voice over Internet Protocol ("VoIP") server 42, a debit application/server 44, an internet connection 46, application and servers monitoring software 48, a main system application 50, a secure access control 52, a system server 54 and a switch 56. The core system module 10 may further include a gateway 58.

The IVR Server 40 comprises hardware that is utilized to initiate connection with the system 100. The IVR server 40 may include a memory and a processor, wherein the memory includes a database storing particular information and software operated by the server in order to access information stored in the database. In particular embodiments, the IVR module 40 is utilized for VoIP, routing purposes, call handlers, call transfers, notifications, reverse number lookup, text-to-speech, speech-to-text, administration, language support, as well as having supported standard and other technologies. The IVR server 40, in particular embodiments, is accessed when a user first needs to use the system 100. The user may access the IVR server 40 by use of a telephone or similar device and call a predetermined number, including the 1-800 number associated with the system, the number connecting it with the IVR server. If the user cannot properly follow the interactive voice prompts and/or needs assistance, the system 100 may transfer the call to a live operator in the contact center who can then assist the user in accessing the system 100. The number of IVR servers 40 is dependent on the number of users. According to particular embodiments, one IVR server 40 can be used for 1,000 current users.

The VoIP server 42 is hardware having a memory and a processor, wherein software is stored on the memory and processed by the processor. The memory may further include a database for storing particular information required for the function of the hardware. The VoIP server 42 is utilized to resolve the telephony service for the final users. Included in this resolving process, the VoIP server 42 performs functions that include, but are not limited to automated authentication, attendant blacklists, blind, transfer call, call forward on busy call, forward on no answer, call forward variable, call monitoring call, parking call queuing, call recording, call routing, call snooping, call transfer call, waiting, H.323 multi-media connections, Session Initiation Protocol ("SIP"), talk detection, text-to-speech, speech-to text, three-way calling and the like.

The Debit application 44 is a software application that is proprietary to the system 100. The debit application 44 serves to control all the debit operations of the system 100. The debit operations depend on the type of service, the client 2 and other characteristics that relate to the service provided by the system 100 and accessed by a client 2. The debit application 44 is stored on a server, such as a debit server having a memory and a processor. The debit application 44 includes a database transactional support, a database support for millions of records, web services connection, is a web based application and is accessed by a secure connection only. Each core system module 10 requires its own database application 44. The debit application 44 is a dynamic application that can evolve based on the evolution of the functionality of the system 100, the changes in financial requirements and demands, as well as demand of use of the system 100.

The Internet connection 46 is a network connection that controls all the debit operations. This connection 46 also depends on the service, client 2 and other characteristics that relate to the service provided by the system 100. The Internet connection 46 provides a clear channel of communication and ensures quality service, continuous support and includes a high-bandwidth. Each system 100 would require at least two Internet connections 46 for redundancy. The quality and support of the Internet connection 46 is a vital element of the system 100, because the Internet connection 46 is a key component of the entire system 100.

The application and servers monitoring software 48 may be stored on a system server 54 or any other server of the core system module 10. The application and servers monitoring software 48 controls all the debit operations. This application also depends on the service, client 2 and other characteristics that relate to the service provided by the system 100. The application and servers monitoring software 48 provides ports monitoring support, service monitoring support, network monitoring, log files, configuration module, live monitoring, graphical user interface ("GUI") administration, GUI monitoring results, user level security and is web based. Each core system module 10 requires the application and servers monitoring software 48.

The main system application 50 is a proprietary application utilized by the system 100 to control all operations of the system, the local and user operations, the central database 60 and all the information related with the system 100. The main system application 50 is web based and provides database transactional support, database support for millions of records, web services connection, secure connections, GUI administration, GUI for clients, VoIP support clients, log users register, HTTP support for external access, and other related features and functionality. Each core system module 10 requires a main system application 50. The main system application 50 may be stored on a system server 54 and the processor of that server may be utilized to execute the software. Further the central database 60 and other system databases may be stored on the system server 54.

The secure access control 52 is a hardware device that provides the required security to protect the system access. The secure access control 52 may include a biometric access system, a log register, an access level configuration, network connectivity, local and remote storing for backup and remote access control. One secure access control 52 is required for each main access of the system 100.

The switch 56 may be one of or a combination of switches. For example, and without limitation, the switch 56 may be a VoIP switch; a callback module that handles short messaging service ("SMS"), automatic number identification ("ANI"), personal identification number ("PIN"), direct inward dialing ("DID"), and Web connections; an IVR module; a resellers module; a call shop module; and online shop module; a soft phone, a PBX, and the like.

Figure 4:
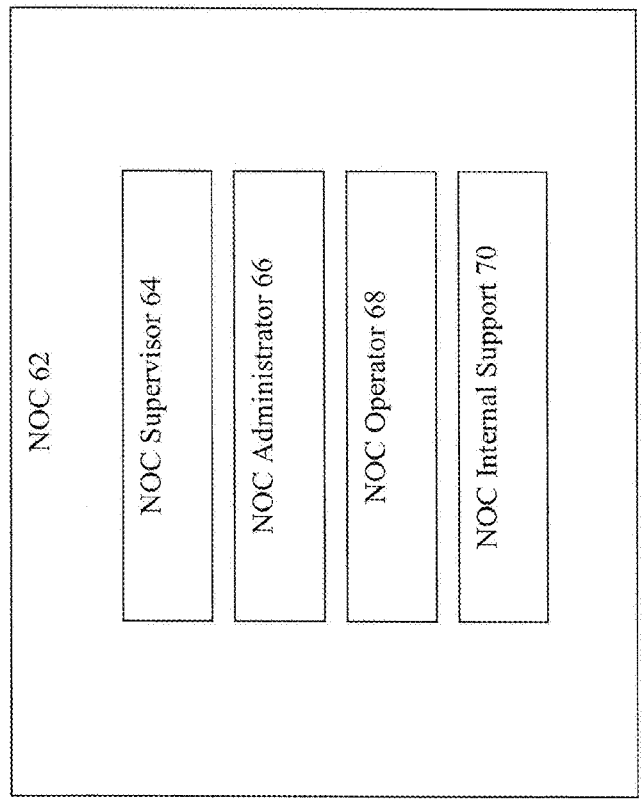
FIG. 4 is a diagrammatic view of a component of a business and social media system in accordance with aspects of the present invention.

In order to maintain and operate the core system module 10, a network operations center ("NOC") 62 is required, wherein the NOC 62, as shown in FIG. 4, includes specific types of people in order to properly run the system 100. For example, the NOC 62 requires an NOC Supervisor 64. The NOC Supervisor is a specialist in the NOC 62 infrastructure and operations. The NOC Supervisor needs to be aware in a specific functionality of the system 100 and have all the elements to resolve any problems within the specific functionality. Accordingly, there may be several NOC Supervisors 64 over several specific functionalities of the system 100, such as, but not limited to, networking knowledge and operation, VoIP services, telephony, network services, server administration, open source knowledge, Linux server administration. It is contemplated that at any given time during operation of the system 100, six NOC Supervisors 64 are needed in order to ensure proper operation of the system 100 and to avert any problems that may arise.

The NOC 62 also requires NOC Administrators 66. The NOC Administrator 66 is responsible for a particular section in the NOC 62 and controls a group of NOC Operators 68 with a specific goal. The NOC administrator 66 is required to have experience in groups administration, NOC experience, networking knowledge, telephony, and VoIP services. It is contemplated that at any given time during operation of the system, one NOC Administrator 66 per section is required.

The NOC 62 also requires the NOC Operators 68. The NOC Operator 68 is a person responsible for supporting the system's 100 clients with problems in the normal use of the system 100. The Operator 68 must be fully bilingual in English and a specific secondary language, have experience in customer support for at least one year, networking knowledge and basic VoIP knowledge.

The NOC 62 also includes NOC Internal support personnel 70. The Internal support personnel 70 is a person that is responsible for supporting internal users and infrastructure of the system's 100 NOC. The NOC internal support personnel 70 requires experience in technical support for at least one year, networking knowledge, basic VoIP knowledge, telephony, NOC experience and server administration. It is contemplated that three NOC Internal Support personnel 70 are required at any given time during operation of the system 100.

It is further contemplated that as all persons described above that form part of the NOC 62 continue in work they may become more skilled and training may be conducted in order to provide proper and quality service. NOC 62 may conduct quality review of its members described above and ensure that each member of the NOC 62 is performing at satisfactory levels to maintain proper operation and functionality of the system 100.

The external modules are critical elements to the system 100 and provide the access points for clients and other user to access the system and utilize the business and social media system 100 to communicate in desired forms of communication with another person, particularly another person in a different country of the client 2.

The external modules of telephone service module 12 and mobile application module 14 may each utilize a more general module that includes a 1-800 service module 15, as shown in FIG. 2. The 1-800 service module 15 includes a 1-800 provider 17, wherein clients may use standard telephones and mobile devices to call a predetermined 1-800 number and access the system 100. The provider 17 that supplies the 1-800 number to be called by clients to access the system 100 is required to support at least 2000 simultaneous services (which are 10% of the capacity of the IVR server), continuous support, live technical support, simultaneous ringing, SIP/VoIP call forwarding and personal setup for clients. Each system 100 needs one 1-800 provider 17.

As with the core system, the 1-800 service module 15 includes a NOC or a 1-800 NOC. The 1-800 NOC includes 1-800 NOC operators that are specialists in the NOC infrastructure and operations. The operator needs to be aware in a specific functionality of the system 100 and have all the elements to resolve any problems within the specific functionality. The 1-800 NOC operator is required to have understanding in networking knowledge and operation, VoIP service, telephony and network services. At any given time during operation of the system 100, three 1-800 NOC operators are required.

The 1-800 NOC further includes a 1-800 NOC Administrator. The administrator is responsible for a section in the 1-800 NOC and controls a group of 1-800 NC operators with a specific goal. The administrator needs to have experience in groups administration NOC experience, networking knowledge, telephony understanding and VoIP understanding. One 1-800 NOC Administrator is needed per section of the 1-800 NOC.

The telephony termination services module 24 includes a telephony termination provider 25. The telephony termination provider 25 may be a third party provider that provides a turnkey telephony termination solution for multiple customers based in two different countries, provide toll free numbers access for two countries, offer least cost routing functionality, provide a first country termination, provide all country terminations, provide integration to core telephony termination module preferred, provide support for both SIP and h.323 protocol termination, provide support for G723, G729, GAM and G711 codecs, provide capacity for up to 20,000 concurrent calls divided in total number of providers, provide growth capacity for the system 100.

The telephony termination service module 24 also includes a telephony termination core module 27 that is software to provide means for telephony termination providers 25 to interact with the core system module 10, to generate reports on traffic to/from providers, to enable monitoring of provider activity, and to integrate telephony termination into other core modules. One of this software 27 is needed by this module 24.

The telephony termination service module 24 includes telephony termination connections. These are physical connections that provide means for telephony termination providers to interact with the core system module 10, generate reports on traffic to/from providers, enable monitoring of provider activity, and integrate telephony termination into other core modules. One connection is required for this module.

As with other modules, the telephony termination service module 24 includes a telephony NOC. The telephony NOC includes an NOC Telephony termination manager. The manager functions to manage NOC telephony termination operators, acts as NOC telephony termination operator as needed, escalates issues with telephony termination providers to the provider's own support team, trains NOC telephony termination operators, reports issues to NOC Administrator, research new providers, backup and redundancy solutions for telephony termination. One manager is needed for every fifteen operators.

The NOC telephony operators are another member of the telephony NOC. The operators function to escalate issues with NOC telephony termination providers, monitor connectivity to telephony termination providers, monitor traffic reports to each provider and train other NOC telephony termination operators.

Additional people are required for the proper operation of the telephony module. For example, a telephony termination provider agent is required to resolve issues on provider's behalf, to inform on maintenance windows on provider's system, to inform on special offers and discounts, and to act a principal contact to the telephony NOC.

The SMS module 26 includes an SMS provider 29. The SMS provider 29 in particular embodiments is a third party provider. The SMS provider 29 serves to provide a turnkey SMS solution for customers based in two countries, to provide integration to the SMS Core Module, to service all major cellular telephony carriers in two countries, to provide capacity for up to 750,000 monthly SMS transactions divided in total number of providers, to provide capacity for up to 1,000 simultaneous SMS ports, divided in total number of providers, and to provide growth capacity for subsequent phases of the system 100.

The SMS module 26 further includes an SMS Core Module 31 is a software application that function to provide turnkey SMS solutions for two countries, to provide means for SMS providers to interact with the core system module 10, to generate reports on traffic to/from providers, to enable monitoring of provider activity and to integrate SMS into other core modules.

The SMS module 26 also includes an SMS connection. The SMS connection is a physical connection that functions to provide a turnkey SMS solution for customers based in two countries, provide IP connectivity to core and Internet, to connect efficiently all SMS providers, to allow enough bandwidth for all 1,000 concurrent transactions, to allow redundancy to internet cloud and to be secured.

As with other modules, the SMS module 26 includes an SMS NOC. The SMS NOC includes an NOC SMS Manager, who functions to manage NOC SMS Operators, to act as NOC SMS Operator if needed, to escalate issues with SMS providers to the provider's own support team, to train NOC SMS operators, to report issues to NOC administrator and to research new providers, backup and redundancy solution for SMS.

The SMC NOC also include NOC SMS operators, who function to escalate issues with NOC SMS manager, to monitor connectivity to SMS providers, to monitor traffic reports to each provider, and to train other NOC SMS operators.

The SMS module further requires additional support people, such as an SMS provider agent. The agent functions to resolve issues on provider's behalf, to inform on maintenance windows on provider's system, to inform on special offers and discount and to act as principal contact to NOC.

The contact center module 22 includes a contact center solution provider, which is a third party provider. The contact center solution provider function to provide a turnkey calling center solution for customers based in two countries, to provide capacity for starting up with 1,000 to 1,400 customer service representatives ("CSRs") and to provide growth capacity for subsequent phases.

The contact center module 22 also includes a contact center solution application. The application is software that provides means for CSRs to interact with the core system module 10, provides means for contact center solution supervisors to generate calling center reports, and enables secure access from contact center solution provider to the core system module 10.

The operation of the contact center module 22 requires the several positioned people. For example the operation of the contact center module 22 requires a contact center manager, a contact center supervisor and customer service representatives. The contact center manager manages supervisors and representatives, accesses reports from the core system module 10 on events handled by CSRs, traffic, services and recordings, resolves high level of contact center support, acts as a supervisor and representative as needed and trains supervisors. The contact center supervisor manages representatives, accesses reports form the core system module 10 on events handled by representatives, traffic, services and recordings, escalates technical difficulties to the manager, escalates support to the manager when needed, resolves mid level issues escalated from representatives, acts as a representative as needed, approves special services and trains representatives. The customer service representative answers calls from the telephony system, answers calls from the web application, routes the call to each service offered, sends SMS on behalf of users, transfers calls to telephony services through the core system module 10, acts as remote hands for clients who do not have access to the online web application, sells products and services, records calls for service approval, resolves low level issues and escalates issues to the supervisor.

Figure 6:
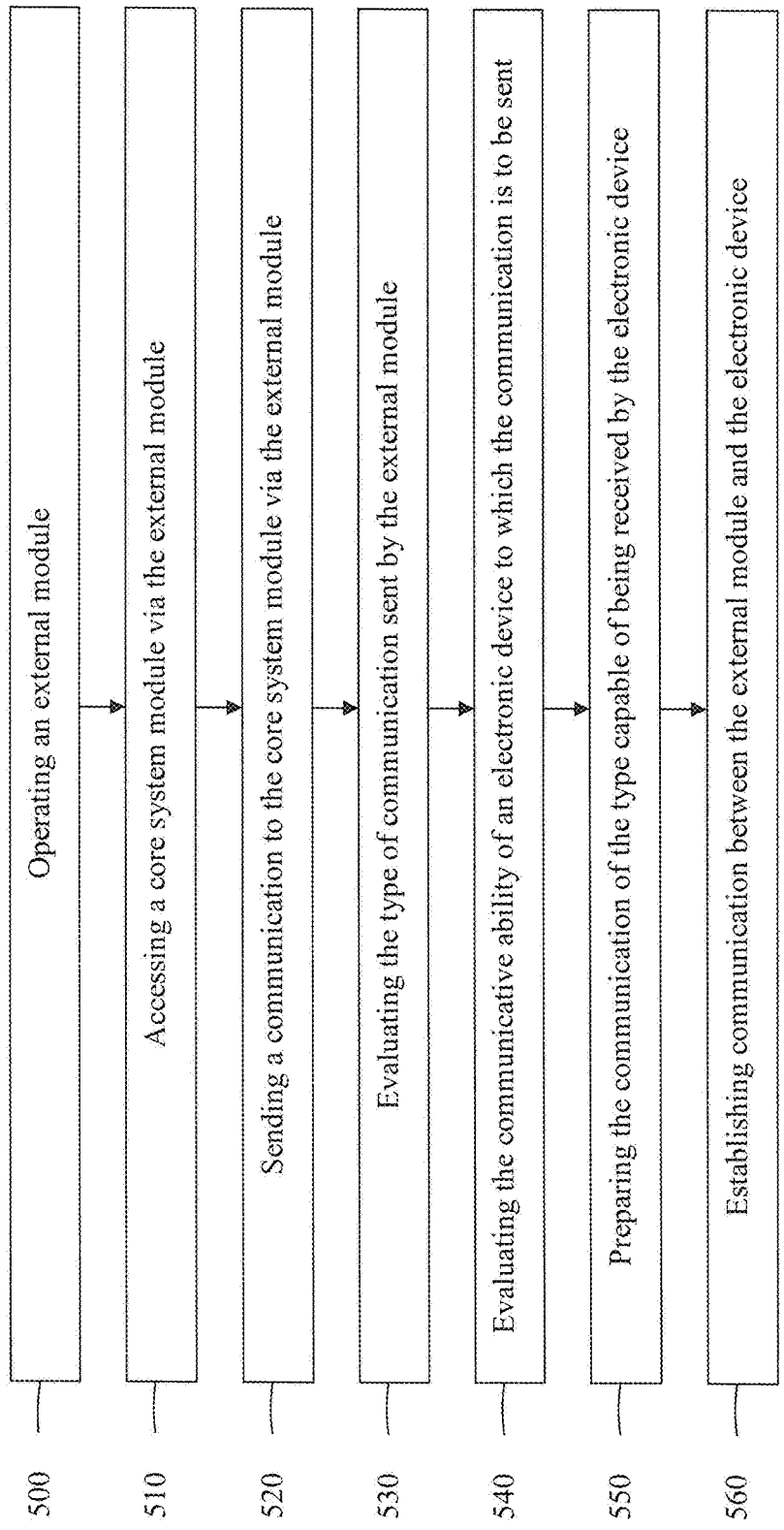
FIG. 6 is a diagrammatic view of a method of networking and communicating in accordance with aspects of the present invention.

A method of networking and communicating according to the present invention is as shown in FIG. 6. The method comprises, providing or setting up a network for placing a client in communication with another person and offering services to the client. The providing the network includes step 500 of operating an external module, including, but not limited to, a cell phone, land line phone, computer with access to the internet, and a SMS or MMS capable device. Then step 510 includes using the external module to access a core system module that establishes the connection between the client and the other person. Step 520 includes the external module sending a communication to the core system module. The core system module evaluates the communication device used by the client, evaluates the type of the incoming communication, step 530, such as a land line phone or SMS capable device, evaluates the communication device associated with the number of the another user designated by the client, step 540, and prepares and transmits the communication to the another user in the form suitable to the capabilities of the electronic communication device of the another user, step 550. The core system module then establishes the connection between the external module and the electronic device, step 560.

The core system module also takes the step of evaluating the identification of the user by prompting the user to enter a numerical code. The core system module then compares the numerical code with the personal identification number (PIN) pre-stored in the core system module and pre-associated with an account of the user to determine if the numerical code matches the PIN. Under the condition that the numerical code matches the PIN, the core system module guides the user/client through the system to reach the desired services that the system provides. The core system module also secures the transactions and operations within the system so that the client's interaction with the system is protected.

The core system module further stores client information on a database in a server. The client information includes biographical information of the client, as well as financial account information, or payment information, and the PIN.

As part of guiding the client through the communication system, the core system module also includes an interactive voice recognition (IVR) system that poses a series of questions to the client and receives the client's answers to the questions. Based on the client's answers, the IVR and the core system module navigate the system to offer solutions to the client's needs, such as, but not limited to, arranging wire transfer of money or placing the client in communication with professional service providers, such as doctors, physiatrists, lawyers, or travel agents, or connecting the client to the another user to establish communication between the client and the another user. Using the IVR system, the client can obtain access to the services offered by the communication system, while remaining anonymous.

Also, as part of guiding the client through the communication system, the core system module determines whether or not the client is having difficulty operating within the communication system and navigates the client to a contact center for help if the client is having difficulty. The contact center may evaluate what services the client desires and, based on the services desired, stand in the place of the client to navigate for the client within the system to place the client at the desired services or obtain the desired services for the client.

The core system module also integrates the use of the communication system by the client with a payment option. The integrating the use of the system with a payment option includes providing an access card to the client, the access card including client information stored in the client account and information regarding a client's financial account tied to the client account. As the client uses the system, the core system module debits the client's financial account according to an amount of use of the system. The real-time balance of the account is maintained by the core system module and is reflected in the client account and is accessible by the access card.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A social network and communication system comprising:
    a core system module having a server for storing and maintaining information regarding a client; and
    an external module,
    wherein the client accesses the core system module via the external module, the core system module verifies the identification of the client by the information, and the core system module guides the client through the system to desired services offered by the system; and
    wherein the desired services include establishing communication with another person, and the core system module establishes the communication between the client and the another person by evaluating the communication capabilities of a communication device used by the another person and communicating with the communication device by preparing the communication of the type suitable to the capabilities of the communication device, wherein the communication type is selected from a group consisting of voice, VoIP, SMS, MMS, audio visual, and video conference.

2. The social network and communication system of claim 1, wherein the external module is one of a land-line phone, a cell phone, an SMS capable device, and a computer having internet access.

3. The social network and communication system of claim 1, wherein under the condition that the core system module determines that the client is having difficulty operating or navigating the system, or at the client's request, the core system module connects the client with a contact center that determines the services the client desires and acts in the stead of the client to navigate the system to place the client at the desired services.

4. The social network and communication system of claim 1, wherein the information includes a stored personal identification number (PIN) previously associated with the client and the core system module verifies the identification of the client by comparing a number provided by the client at the prompt of the core system module with the stored PIN.

5. The social network and communication system of claim 1, wherein the core system module integrates the client's use of the system with a payment option.

6. The social network and communication system of claim 5, wherein the integration of the client's use and the payment option includes the core system module associating the client's use of the system with a predetermined client account, wherein the account is associated with a system access card maintained by the client.

7. The social network and communication system of claim 6, wherein the access card is a pre-paid reloadable card that the core system module debits according to the use of the system by the client, the real-time balance of the account being stored on the core system module and accessible by the card.

8. A social network and communication system comprising:
    a core system module having a server for storing and maintaining information regarding a client in a client account, wherein the account is affiliated with a financial account and is associated with a personal identification number (PIN);
    an external module; and
    an access card, the access card being associated with the client account and maintained by the client,
    wherein the client accesses the core system module via the external module using the access card, the core system module verifying the identification of the client prior to permitting the client to access the core system by prompting the client to enter a numerical code and comparing the numerical code with the PIN, and based on a positive result of the comparison, guiding the client through the system to provide the client with requested services offered by the system; and
    wherein the desired services include establishing communication with another person, and the core system module establishes the communication by evaluating the communication capabilities of a communication device used by the another person and communicating with the communication device by preparing the communication of the type suitable to the capabilities of the communication device, wherein the communication type is selected from a group consisting of voice, VoIP, SMS, MMS, audio visual, and video conference.

9. The social network and communication system of claim 8, wherein the external module is one of a land-line phone, a cell phone, a MMS capable device, a SMS capable device, and an electronic device that can access the internet and browse.

10. The social network and communication system of claim 8, wherein the core system module integrates the client's use of the system with the financial account of the client, wherein the financial account is associated with the access card maintained by the client and the access card is a pre-paid reloadable card that the core system module debits according to the use of the system by the client, the real-time balance of the financial account being stored in the client's account and accessible by the card.

11. The social network and communication system of claim 8, wherein under the condition that the core system module determines that the client is having difficulty operating or navigating the communication system, or at the client's request, the core system module connects the client with a contact center that determines the services the client desires and acts in the stead of the client to navigate the system to place the client at the desired services.

12. A method of using a social networking and communicating system comprising:
- providing a social networking and communicating system comprising an external module and a core system module;
- operating an external module;
- accessing a core system module via the external module;
- sending a communication to the core system module via the external module;
- evaluating the type of communication sent by the external module;
- evaluating the communicative ability of an electronic device to which the communication is to be sent;
- preparing the communication of the type capable of being received by the electronic device, wherein the communication type is selected from a group consisting of voice, VoIP, SMS, MMS, audio visual, and video conference; and
- establishing communication between the external module and the electronic device.

13. The method of claim 12, wherein the method further comprises:
- verifying the identification of a user of the external module prior to accessing the core system module;
- integrating the use of services of the core system module with a payment option;
- guiding the user to obtain desired services; and
- debiting a user account based on the use of the services of the core system module by the user.

* * * * *